United States Patent Office 2,776,306
Patented Jan. 1, 1957

2,776,306
CYANOISOPROPYLSILANES

Quintin P. Cole, Pittsfield, Mass., assignor to General Electric Company, a corporation of New York No Drawing. Application December 31, 1953,
Serial No. 401,690

5 Claims. (Cl. 260—448.2)

This invention relates to novel organosilanes and more particularly, is concerned with compositions of matter comprising (1) a cyanosilicon composition selected from the class consisting of cyanoisopropylsilanes having the formula:

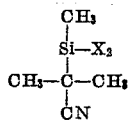

and (2) di-(alpha-cyanoisopropyl)-1,3-dimethyldisiloxanediol-1,3 having the formula:

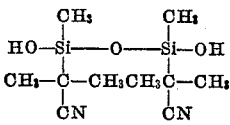

where X is a member selected from the class of halogens (e. g., chlorine, bromine, fluorine, etc.) and alkoxy radicals of the formula —OR where R is a lower alkyl radical (e. g., methyl, ethyl, propyl, isopropyl, butyl, etc.). Compositions defined by (1) above can be employed as intermediates in the preparation of valuable organopolysiloxane oils, resins, rubbers, etc. whereby these hydrolyzable methyl alpha cyanoisopropylsilanes can be hydrolyzed either alone or in combination with other hydrolyzable organosilanes (e. g., dimethyldichlorosilane, mixtures of dimethyldichlorosilane and diphenyldichlorosilane, methyltrichlorosilane and dimethyldichlorosilane, etc.) employing the usual methods well known in the art for hydrolyzing organosilanes containing silicon-bonded hydrolyzable groups. The composition defined by (2) above may be intercondensed with itself to remove water whereby valuable organopolysiloxanes useful in the same fields as described above can be obtained. Such condensed products may be in the form of viscous or free flowing fluids which can be further polymerized or condensed by means of suitable agents, such as potassium hydroxide to give valuable silicone rubber products which when combined with a filler and curing agent such as benzoyl peroxide and heated at elevated temperatures of the order of about 100–150° C. give cured, solid, elastic products which exhibit good resistance to elevated temperatures for long periods of time while at the same time having good flexibility at low temperatures of the order of —30° to —40° C.

In order that those skilled in the art might better understand how the present invention can be practiced the following example is given by way of illustration and not by way of limitation. All parts are by weight.

Example 1

To a reaction vessel equipped with stirrer and reflux condenser maintained under anhydrous conditions were added 450 parts methyltrichlorosilane, 69 parts isobutyronitrile and 23 parts sodium in the form of small pieces while maintaining the entire mixture under agitation at all times. About one-third of the sodium was added at first and the mixture stirred and heated gently until the reaction became self-sustaining. Initiation of the reaction was evidenced by the appearance of a yellow coating on the sodium followed shortly by the separation of a fine precipitate of sodium chloride with the mild evolution of hydrogen. The remainder of the sodium was added slowly over a period of about 4 hours so that the reaction vessel remained moderately hot throughout (temperatures of about 50–60° C.). The mixture was then stirred for about 24 hours until all the sodium had disappeared while at the same time applying a small amount of heat to maintain the reaction temperature during the latter stages. The precipitate thus formed was removed and washed with methyltrichlorosilane, the filtrate and washings were then fractionally distilled to remove the unreacted methyltrichlorosilane and isobutyronitrile. Fractional distillation of the remainder yielded a product boiling at about 98–107° C. (49 mm.) which was identified as being essentially pure alpha-cyanoisopropylmethyldichlorosilane as evidenced by the fact that it contained about 34.9% carbon, 5.5% hydrogen and 6.8% nitrogen.

Example 2

The alpha-cyanoisopropylmethyldichlorosilane described in Example 1 was used to prepare alpha-cyanoisopropylmethyldimethoxysilane, as follows. More particularly, a solution of 13 grams of the aforesaid dichlorosilane in 30 cc. benzene was added dropwise to a cooled and stirred solution of 11.3 grams of pyridine, 4.6 grams methanol, and 20 cc. benzene. The precipitate of pyridine hydrochloride was filtered off and washed with benzene. Distillation of the benzene solutions yielded a liquid fraction boiling at about 81.0–81.5° C. (16 mm.). This material was identified as essentially pure alpha-cyanoisopropylmethyldimethoxysilane as evidenced by the analysis thereof which showed that it contained 48.0% carbon, 8.57% hydrogen 7.79% nitrogen and 16.5% silicon (theoretically 48.6% carbon, 8.67% hydrogen, 8.08% nitrogen, and 16.2% silicon).

Example 3

In this example, the reaction illustrating the preparation of di-(alpha-cyanoisopropyl)-1,3-dimethyldisiloxanediol-1,3 was carried out in glassware which was boiled previously to being used in dilute nitric acid and thereafter rinsed with distilled water. About 30 cc. of freshly boiled distilled water and 7.94 grams of alpha-cyanoisopropylmethyldimethoxysilane were combined in a reaction vessel immersed in a water bath maintained at a temperature of approximately 50° C. The two-phase mixture was stirred moderately for about 30 minutes until most of the upper organic phase had disappeared. The undissolved organic liquid was removed by two extractions with hexane and the water phase concentrated to a clear viscous liquid by a jet of nitrogen. This material, which was sensitive to heat, was identified as essentially pure di-(alpha-cyanoisopropyl)-1,3-dimethyldisiloxanediol-1,3 as evidenced by the fact that it was found to contain 9.43% nitrogen, 20.3% silicon, and 12.3% hydroxyl groups when measured by the Karl Fischer method (theoretically 10.3% nitrogen, 20.6% silicon, and 12.5% hydroxyl). The hydrogen analysis of 7.59% (theoretically 7.35%) clearly indicates that the desired compound was obtained although analyses for carbon were slightly low due to the possible elimination of small amounts of the cyanoisopropyl group during the period that analysis for carbon was being carried out.

Example 4

In the same manner as described above in Example 2, other alkoxy-methyl alpha-cyanoisopropylsilanes can be obtained by employing instead of methanol equivalent amounts of, for instance, ethanol, propanol, isopropanol, etc., to give compounds such as alpha-cyanoisopropylmethyldiethoxysilane, alpha - cyanoisopropylmethyldipropoxysilane, alpha-cyanoisopropylmethyldiisopropoxysilane, etc.

What I claim as new and desire to secure by Letters Patent of the United States is:

1. A composition of matter selected from the class consisting of (1) organosilanes having the formula:

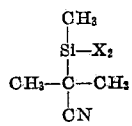

and (2) a methyl alpha cyanoisopropylsilane having the formula:

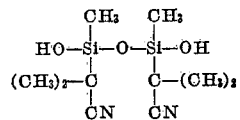

where X is a hydrolyzable group selected from the class consisting of halogens and alkoxy radicals of the formula —OR where R is a lower alkyl radical.

2. The chemical composition alpha-cyanoisopropylmethyldichlorosilane.

3. The chemical composition alpha-cyanoisopropylmethyldimethoxysilane.

4. The chemical composition di-(alpha-cyanoisopropyl)-1,3-dimethyldisiloxanediol-1,3.

5. The process for making alpha-cyanoisopropylmethyldichlorosilane which comprises effecting reaction under anhydrous conditions in the presence of metallic sodium between methyltrichlorosilane and isobutyronitrile, and thereafter isolating the alpha-cyanoisopropylmethyldichlorosilane.

References Cited in the file of this patent

UNITED STATES PATENTS 2,687,424     Sommer _____ Aug. 24, 1951

FOREIGN PATENTS 961,878     France _____ Nov. 28, 1948